United States Patent
Geoghegan (10) Patent No.: US 7,165,054 B2
(45) Date of Patent: Jan. 16, 2007

(54) CUSTOM ELECTRONIC LEARNING SYSTEM AND METHOD

(75) Inventor: David Geoghegan, Ravena, NY (US)

(73) Assignee: KnowledgeXtensions, Inc., Delmar, NY (US)

( * ) Notice: Subject to any disclaimer, the term of this patent is extended or adjusted under 35 U.S.C. 154(b) by 521 days.

(21) Appl. No.: 10/244,266

(22) Filed: Sep. 16, 2002

(65) Prior Publication Data

US 2003/0055800 A1 Mar. 20, 2003

Related U.S. Application Data

(60) Provisional application No. 60/322,054, filed on Sep. 14, 2001.

(51) Int. Cl.
- *G06E 1/00* (2006.01)
- *G06E 3/00* (2006.01)
- *G06F 15/18* (2006.01)
- *G06G 7/00* (2006.01)

(52) U.S. Cl. ............................................ 706/16
(58) Field of Classification Search ............... 706/45, 706/16; 434/362
See application file for complete search history.

(56) References Cited

U.S. PATENT DOCUMENTS

| | | | |
|---|---|---|---|
| 4,791,558 A * | 12/1988 | Chaitin et al. | 717/140 |
| 5,727,951 A * | 3/1998 | Ho et al. | 434/362 |
| 5,934,909 A * | 8/1999 | Ho et al. | 434/362 |
| 6,868,525 B1 * | 3/2005 | Szabo | 715/738 |

OTHER PUBLICATIONS

Towards a dynamic CORBA component platform Marvic, R.; Merle, P.; Geib, J.-M.; Distributed Objects and Applications, 2000. Proceedings. DOA '00. International Symposium (2000) pp. 305-314, Digital Object Indentifier 10.1109/DOA.2000.874202.*

Associations as a language construct Osterbye, K.; Technology of Object-Oriented Languages and Systems, 1999, Proceedings of (1999) pp. 224-235 Digital Object Identifier 10.1109/TOOLS.1999.779015.*

* cited by examiner

*Primary Examiner*—Anthony Knight
*Assistant Examiner*—Michael B. Holmes
(74) *Attorney, Agent, or Firm*—Hoffman, Warnick & D'Alessandro, LLC (57) ABSTRACT

A system and method for generating a custom learning object. The system and method generate the custom learning object based on a knowledge object and a set of user characteristics for a user. In one embodiment, the knowledge object is converted to a set of knowledge atoms. Each knowledge atom is then mapped to a container defining an output format. One or more containers are combined to define the custom learning object.

20 Claims, 5 Drawing Sheets

CUSTOM ELECTRONIC LEARNING SYSTEM AND METHOD

REFERENCE TO PRIOR APPLICATION

The current application claims priority to co-pending provisional application Ser. No. 60/322,054, filed on Sep. 14, 2001 and incorporated herein by reference.

BACKGROUND OF THE INVENTION

1. Technical Field

The present invention generally relates to a method and system for converting an electronic data object into a custom electronic learning object. More particularly, the present invention relates to the translation of one or more electronic data objects (e.g., documents, streaming video, etc.) into one or more custom learning objects that enable customized (personalized) courses and training that can be provided over a computer network.

2. Background Art

Computers have become pervasive in all aspects of business and education largely because of their ability to quickly and flawlessly store and retrieve information. The ability to network computers further eased the dissemination of information to individuals, limited groups of people, and/or large audiences. Networks include both private networks, such as one-to-one connection, computers within an office or company, virtual private networks (VPNs), etc. and public networks, such as local area networks (LANs), wide area networks (WANs), the Internet, etc., and combinations of public and private networks.

The unique capabilities of computers and computer networks, in contrast to paper documents, allow users to retrieve, store, and interact with information in many new and useful ways that are beneficial to employers. As a result, the field of Information Technology (IT) rapidly expanded into the public and private sectors. This created a new and substantial challenge for employers: finding, training, and retaining skilled IT workers ("IT specialists") to install, manage, and support the IT needs of the employer. Some employers have encountered substantial problems in hiring IT specialists, and have opted to retrain workers with non-IT backgrounds. However, this approach quickly becomes a large cost for employers. As businesses, governments, not-for-profits, educational, and healthcare institutions become increasingly dependent on IT, the challenge to employ IT specialists grows. However, IT specialist staffing problems is only the tip of the proverbial iceberg.

Another challenge, parallel to IT specialist staffing but perhaps more subtle, is an employer's need to find, train, and retain skilled workers to use IT to perform the "business" of the employer ("IT users"). IT users, and the jobs they perform, are the fundamental reason that there is such a growing dependency on IT. IT users far outnumber IT specialists for most employers, and are the workers that create goods or perform services on behalf of the employer. Therefore, an employer can incur substantial costs, both in terms of efficiency and customer satisfaction, when IT users are not properly trained on using IT. For example, an employer's new database server may be superbly maintained by highly skilled IT specialists. The server and software can be the fastest available with the most sophisticated analytical tools. However, if the employees in accounting or marketing (i.e., IT users) don't know how to perform queries, then these resources are wasted.

Prior to the rise of IT, printed manuals provided the most common source for learning. Today, many manuals available over networks are merely computerized versions of the old printed manuals. While some helpful capabilities such as hyperlinks are often included, the full potential of the media remains underutilized. Further, additional information, including anecdotes and procedures scattered around an organization, are increasingly recognized as part of an employer's intellectual capital. Companies are beginning to understand the need to make this information available to employees in a more organized and accessible manner.

Technology changes at a rapid pace, and employees do not produce any benefit to an employer while being trained on the latest release. Consequently, knowledge needs to be organized and disseminated in a highly efficient and cost effective manner to minimize training time. Computers, and especially networked computers, offer an opportunity for employers to move beyond the generic manual, electronic or paper.

For example, the multimedia capabilities of computers provide a unique avenue for providing information to users. When compared to the traditional text-only environment, multimedia offers a richer learning environment in which to communicate complex ideas. Using audio, for example, information can be provided using speech or music. Similarly, video can be used to show re-enactments of complex software procedures. Exploiting the capabilities of networked computers, video and audio can be used to show real-time satellite data downloaded from the Internet to test skill acquisition with live data, or provide synchronous distance learning that incorporates the traditional, and still-valuable, instructor-led classroom.

Depending on the intended audience, the appropriate IT platform for presenting information may also vary. Different situations/audiences may desire information presented over traditional platforms (i.e., desktop/portable computers connected to a network), wireless delivery to devices (i.e., personal digital assistants, cell phones, etc.), and other devices (i.e., WebTV, set-top boxes, etc.). Other considerations may also factor into information delivery. For example, the quantity of data may be adjusted according to bandwidth limitations inherent in the connection method used, including modems, TI lines, cable modems, satellite connections, etc.

Further, learning styles can be taken into consideration in how information is presented. Some individuals learn best by listening, others by watching, still others by doing. Some learn best by having to assimilate ideas and re-express them to others by speaking or writing, and some learn best with a mix of styles, depending on the subject or skill or idea that the individual seeks to grasp. Visual, verbal, auditory, or mathematical expressions all have their place in learning. One strength of the current technology is its ability to employ different styles with the same content. For example, some web sites offer sound effects with audio files and the option for users to disable them, or the selection between frames or non-frames in a web page layout. Every time an individual selects one over the other he/she exercises a cognitive preference.

As the presence and use of technology matures, workers have become increasingly comfortable with technology. Workers are becoming accustomed to incorporating technology in their entertainment, communications, and educational environments. Already, workers using CD-ROM or computer-based training (CBT) systems to enhance job skills are demanding more from these learning environments. Companies can easily retain and create excellent employees by offering not only the latest training content, but a training approach that can be customized to the distinctive way in which each employee learns.

By properly exploiting the abilities of computers, employers and educators could customize the selection, sequencing and presentation for each individual based on their knowledge, needs and methods of learning. While some systems are being developed to meet this need, these systems currently require a great deal of expertise to implement a useable product.

In view of the above, there exists a need for a method and system for separating information content from presentation format thereby allowing for the customization of the presentation on the basis of individual or group profiles (language, familiarity with topic, and/or learning style), organizational needs and technical factors (hardware and bandwidth availability, handicapped accessibility), and/or legal or regulatory requirements. Additionally, there exists the need for a method and system that allows a corporation or group to transform, without substantial expertise, existing manuals into computerized learning environments that are customizable based on the current knowledge, needs and learning style(s) of individuals and groups of individuals.

For both IT specialists and IT users, today's training material is tomorrow's reference material. Consequently, a further need exists for a system and method that uses identical information as both training and reference material. Training and reference material should be rooted in the content, not the presentation format, of an organization's knowledge base. Although material may be initially presented in a format suitable for training, the system and method ensures that the same material is available, and appropriately recast, for later reference. As a result, the system and method yield organization-wide content with user-specific presentation.

SUMMARY OF THE INVENTION

The current invention provides a custom electronic learning system and method. In particular, the current invention creates a custom learning object based on a set of user characteristics and one or more knowledge objects.

A first aspect of the invention provides a custom electronic learning system, comprising: a characteristic system for defining a set of user characteristics for a user; a conversion system for converting a knowledge object into a set of knowledge atoms; and a compiler system for generating a learning object based on the set of user characteristics and the set of knowledge atoms.

A second aspect of the invention provides a method of generating a custom electronic learning object, comprising: receiving a knowledge object; defining a set of user characteristics for a user; creating a set of knowledge atoms based on the knowledge object, wherein each knowledge atom includes: learning data based on a portion of information in the knowledge object; and a type attribute describing the learning data; and generating the learning object based on the set of knowledge atoms and the set of user characteristics.

A third aspect of the invention provides a system for generating a custom electronic learning object, comprising: a set of user characteristics for a user including a learning style; a set of knowledge atoms, wherein each knowledge atom includes learning data; and a compiler system for generating the learning object, the compiler system including a set of containers, wherein each container defines an output format; and wherein the learning object comprises each knowledge atom mapped into at least one container based on at least the learning style.

The exemplary aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

The current invention provides a custom electronic learning system. The system presents a set of learning information to users that is specific to the user characteristics of individual users. In particular, the system can alter the sequence, selection and presentation of learning information to meet the specific characteristics of individual learners. Thus, visual learners can receive a set of learning information in one format (using, e.g., diagrams, colors, etc.), while textual learners can receive the learning information in a straightforward textual format. Moreover, the learning information can be presented at different levels of detail, depending on the job tasks of the learner. For instance, a technician may need more details than a marketing person, so the system would deliver fewer details to the marketing person. Finally, the system can also alter the learning information based on the learning environment (e.g., high speed internet versus, dial-up PDA).

To achieve this, the system first identifies the learning characteristics of a user (e.g., top down visual learner). The system then tailors learning information for the particular user within an organization. As described below, learning information is first converted into knowledge objects comprising a format that can be easily reconfigured into many different types of custom learning objects based on the inputted user characteristics.

Figure 1:
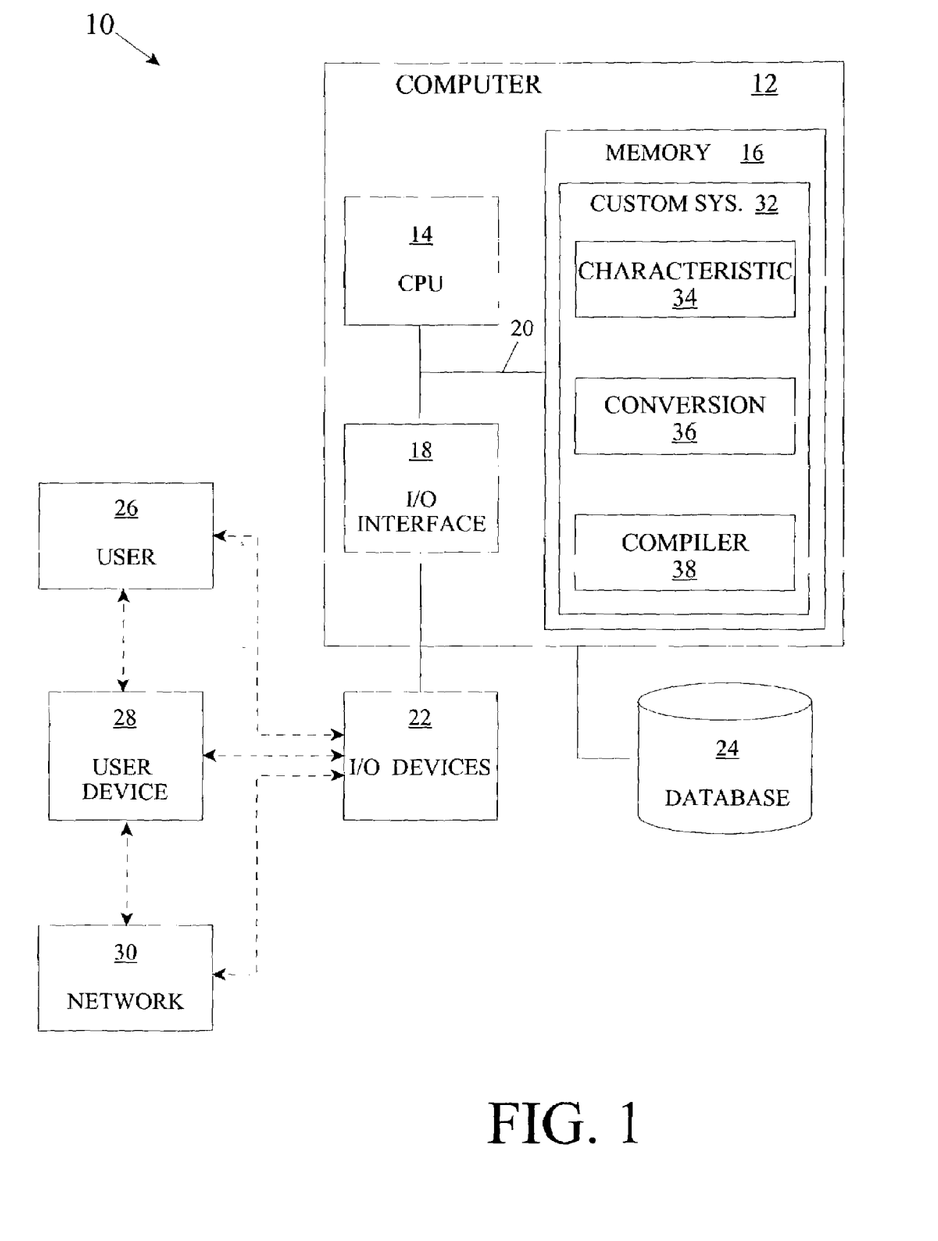
FIG. 1 depicts a custom electronic learning system according to one aspect of the invention.

Turning to the figures, FIG. 1 shows a custom electronic learning system 10 according to one aspect of the invention. System 10 includes a computer 12 that generally comprises central processing unit (CPU) 14, memory 16, input/output (I/O) interface 18, bus 20, I/O devices 22 and database 24. User 26 can communicate and operate computer 12 by interfacing with one or more I/O devices 22, or by operating a user device 28 in communication with one or more I/O devices 22 either directly or using a network 30. Communications between user device 28, computer 12, and/or network 30 can be implemented using any method or combination of methods, including, wireless, satellite, ethernet, fiber optic, serial, parallel, etc. Network 30 can comprise any type of network, including, a private network, such as a one-to-one connection, an office-wide or company-wide network, a virtual private network (VPN), etc., a public network, such as a local area network (LAN), a wide area network (WAN), a global network, the Internet, etc., or a combination of public and private networks. While a single network 30 is shown, it is understood that different and/or multiple networks 30 can be used by user 26.

Computer 12 can comprise an advanced mid-range multiprocessor-based server utilizing standard operating system software, which is designed to drive the operation of the particular hardware and which is compatible with other system components and I/O controllers. CPU 14 may comprise a single processing unit, multiple processing units capable of parallel operation, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, similar to CPU 14, memory 16 may reside at a single physical location, comprising one or more types of data storage, or be distributed across a plurality of physical systems in various forms.

I/O interface 18 may comprise any system for exchanging information with one or more I/O devices 22, including an I/O port (serial, parallel, ethernet, keyboard, mouse, etc.), a universal serial bus (USB) port, expansion bus, integrated drive electronics (IDE), etc. I/O devices 22 may comprise any known type of input/output device capable of communicating with I/O interface 18 with or without additional devices (i.e., expansion cards), including a network system, a modem, speakers, a monitor (cathode-ray tube (CRT), liquid-crystal display (LCD), etc.), hand-held device, keyboard, mouse, voice recognition system, speech output system, scanner, printer, facsimile, pager, storage devices, etc. Bus 20 provides a communication link between each of the components in computer 12 and likewise may comprise any known type of transmission link, including electrical, optical, wireless, etc. In addition, although not shown, additional components, such as cache memory, communication systems, system software, etc., may be incorporated into computer 12.

Database 24 may provide storage for information necessary to carry out the present invention as described in more detail below. As such, database 24 may include one or more storage devices, such as a magnetic disk drive or an optical disk drive. Further, database 24 can include data distributed across, for example, a LAN, WAN or a storage area network (SAN) (not shown). Database 24 may also be configured in such a way that one of ordinary skill in the art may interpret it to include one or more storage devices.

It is understood that although not shown, user device 28 typically contains components (e.g., CPU, memory, etc.) similar to computer 12. Such components have not been separately depicted and described for brevity purposes. User device 28 can comprise any type of device capable of accepting input, providing output, and communicating with another device. For example, user device 28 can be a mobile phone, a handheld computer, a personal digital assistant, a portable (e.g., laptop) computer, a desktop computer, a mainframe computer, etc.

Custom system 32 is shown stored in memory 16 as computer program code. Custom system 32 generates one or more custom electronic learning objects. According to one aspect of the invention, custom system 32 includes a characteristic system 34, a conversion system 36, and a compiler system 38 described in further detail below.

Figure 2:
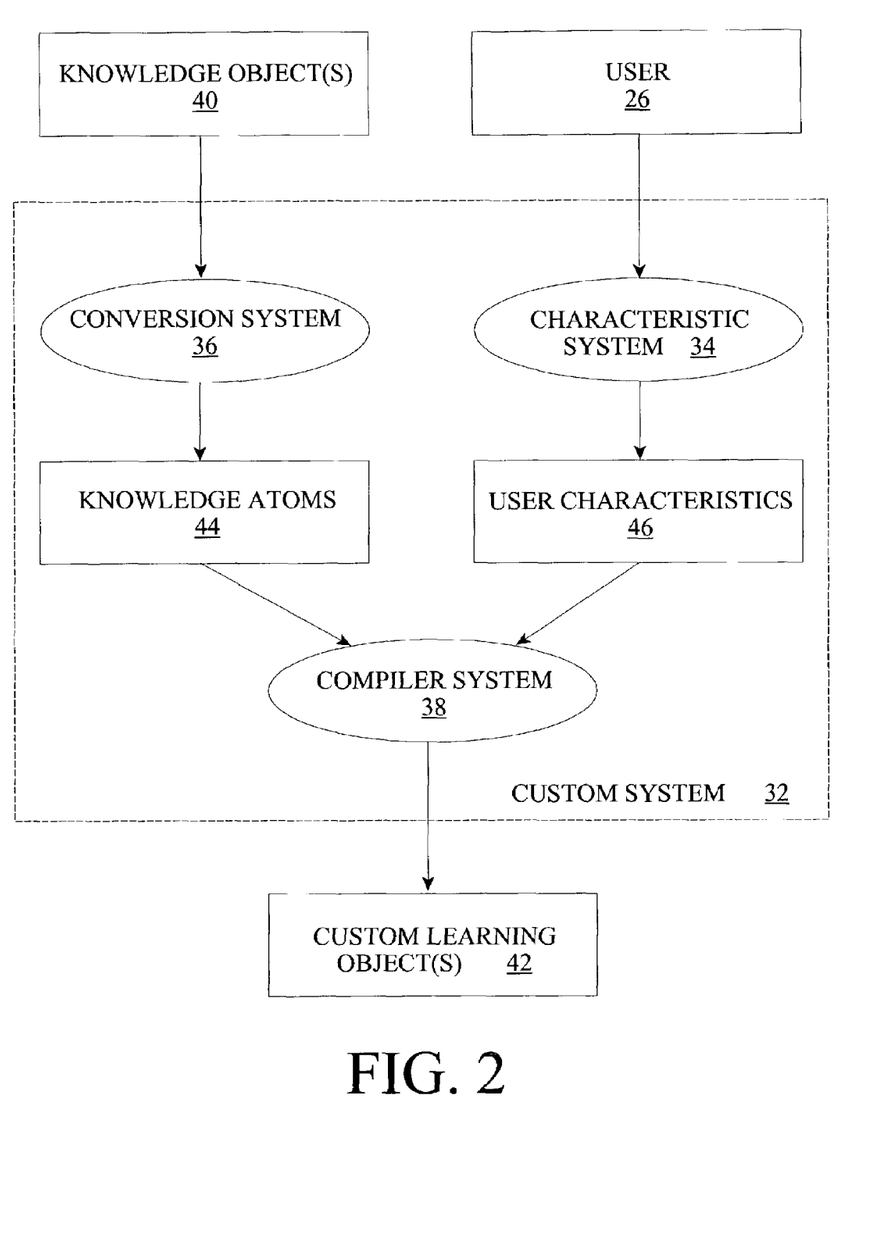
FIG. 2 depicts an exemplary implementation of the custom system shown in FIG. 1.

FIG. 2 provides a detailed view of custom system 32. As shown, custom system 32 accepts one or more knowledge objects 40 and produces one or more custom learning objects 42. User 26 interacts with custom system 32 to affect the sequence, selection and presentation (i.e., appearance) of custom learning objects 42. Knowledge object 40 and custom learning object 42 comprise any electronic representation of information. For example, knowledge object 40 or custom learning object 42 can comprise an electronic file that stores a word processing document, a web page, a spreadsheet, a presentation, an e-mail, a chart, an image, an audio file, a video, etc.

Custom system 32 includes a conversion system 36 to receive knowledge object 40 and convert the knowledge object 40 into a set of knowledge atoms 44. Each knowledge atom 44 represents an elementary piece of information that was contained in knowledge object 40. For example, a knowledge object may comprise a user manual stored as a word processing document having knowledge atoms that may include a title, subheadings, written text, highlighted text, tips, footnotes, etc. Each knowledge atom 44 stores information as learning data, and also includes a type attribute that describes the learning data. For example, the learning data can be the text of a "tip" that was contained in the word processing document. Consequently, the type attribute would identify the knowledge atom as representing a "tip" and containing text. Further, knowledge atom 44 can include a level attribute that represents a measure of detail of the learning data. Thus, a "tip" may be assigned a highly detailed level attribute, while a "subheading" may be assigned a low level attribute.

Once obtained, knowledge atoms 44 that represent a knowledge object 40 are stored in a tree structure or other similar structure to allow for easy navigation. For example, custom system 32 can convert each knowledge object 40 into a tree structure stored in extensible markup language (XML). Thus, the document title may be at the top of the tree, followed by subheadings, text, footnotes, etc.

Figure 3:
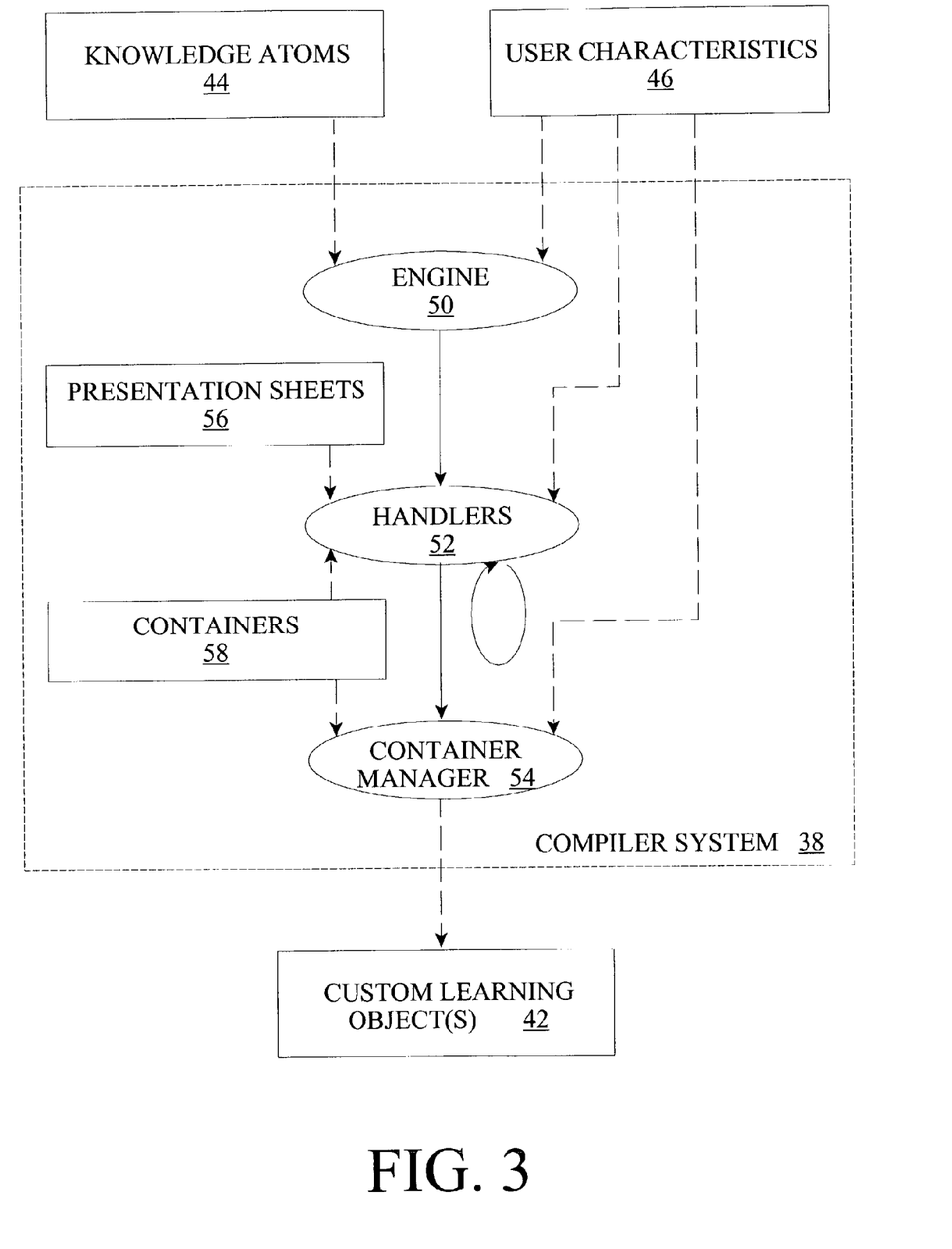
FIG. 3 depicts an exemplary implementation of the compiler system shown in FIGS. 1 and 2.
Figure 4:
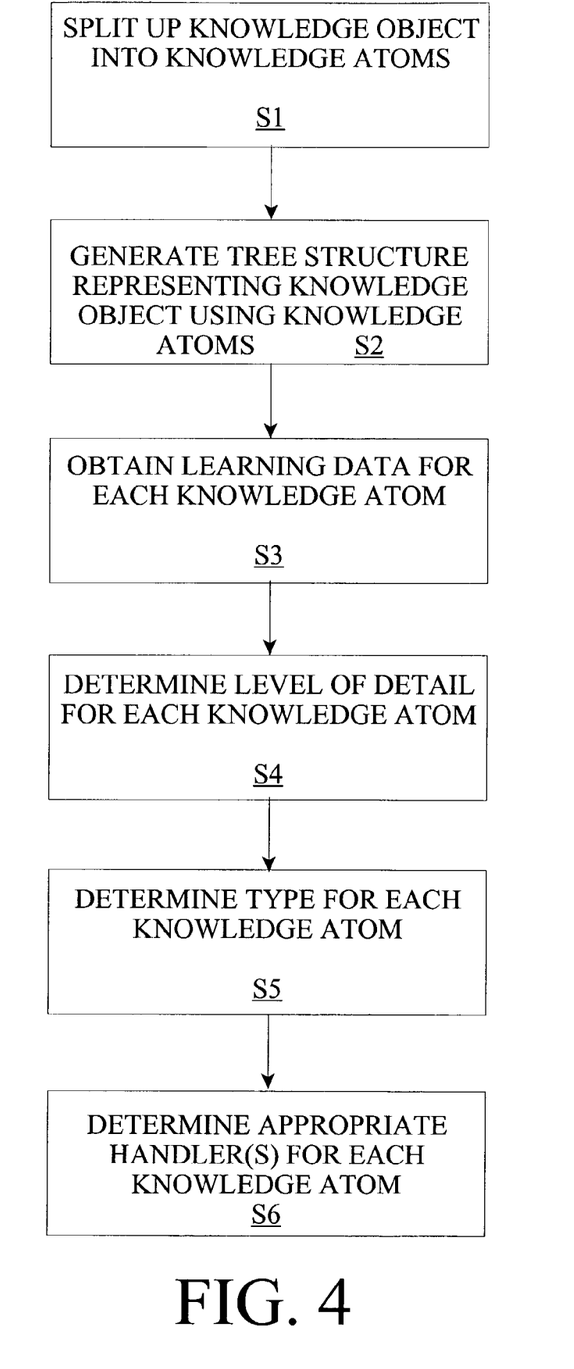
FIG. 4 depicts a method of converting a knowledge object to a set of knowledge atoms according to one aspect of the invention.

FIG. 4 depicts an exemplary method of converting a knowledge object to a set of knowledge atoms stored in a tree structure. In step S1, for example, the knowledge object is split up into knowledge atoms. This step analyzes the knowledge object to break up the information provided in the document into elementary parts. Each elementary part is assigned to a knowledge atom. In step S2, the knowledge atoms are stored in a tree structure, or some other structure allowing for the efficient navigation of the set of knowledge atoms. In step S3, information is stored in each knowledge atom, i.e., the learning data is assigned to each knowledge atom (e.g., <title>="USER MANUAL"). This may comprise copying text into the knowledge atom, providing a pointer to a streaming video, etc. In step S4, a level of detail is determined for each knowledge atom. This determination is made based on a semantic and presentation analysis of the knowledge object. For example, in a word processing document, the words and context are analyzed. Phrases in bold and/or a larger point size may be placed at a low level of detail, while "tips" or glossary definitions can be placed at a high level of detail. In step S5, a type attribute is determined for each knowledge atom. For example, a knowledge atom can represent a table of contents, glossary, paragraph, heading, etc., from a word processing document. In step S6, one or more handlers (described in more detail below with respect to FIG. 3) are assigned. In general, each handler performs the necessary functions for formatting a knowledge atom in a particular manner. For example, a table of contents knowledge atom may include a handler for presenting the learning data on a web page, and a second handler for presenting the learning data in a word processing document.

Returning to FIG. 2, to enable the creation of a custom learning object 42, user characteristics 46 for each user 26 or group of users should also be defined. To achieve this, user 26 interacts with characteristic system 34 to define a set of user characteristics 46. User characteristics 46 include any attribute or information that affects the efficient display and format of custom learning object 42. User characteristics 46 can be selected by user 26, detected by characteristic system 34, and/or determined by characteristic system 34. For example, user 26 can select a learning style, or take a test to determine the learning style. User characteristics 46 can include attributes for groups of users (e.g.,, job type, user privileges, level of detail, year in college, etc.), system attributes (e.g., bandwidth, screen dimension, user device, etc.), and user-specific attributes (e.g., experience, learning style, etc.). In addition, characteristic system 34 can provide user 26 with the ability to dynamically change some or all of user characteristics 46.

Figure 5:
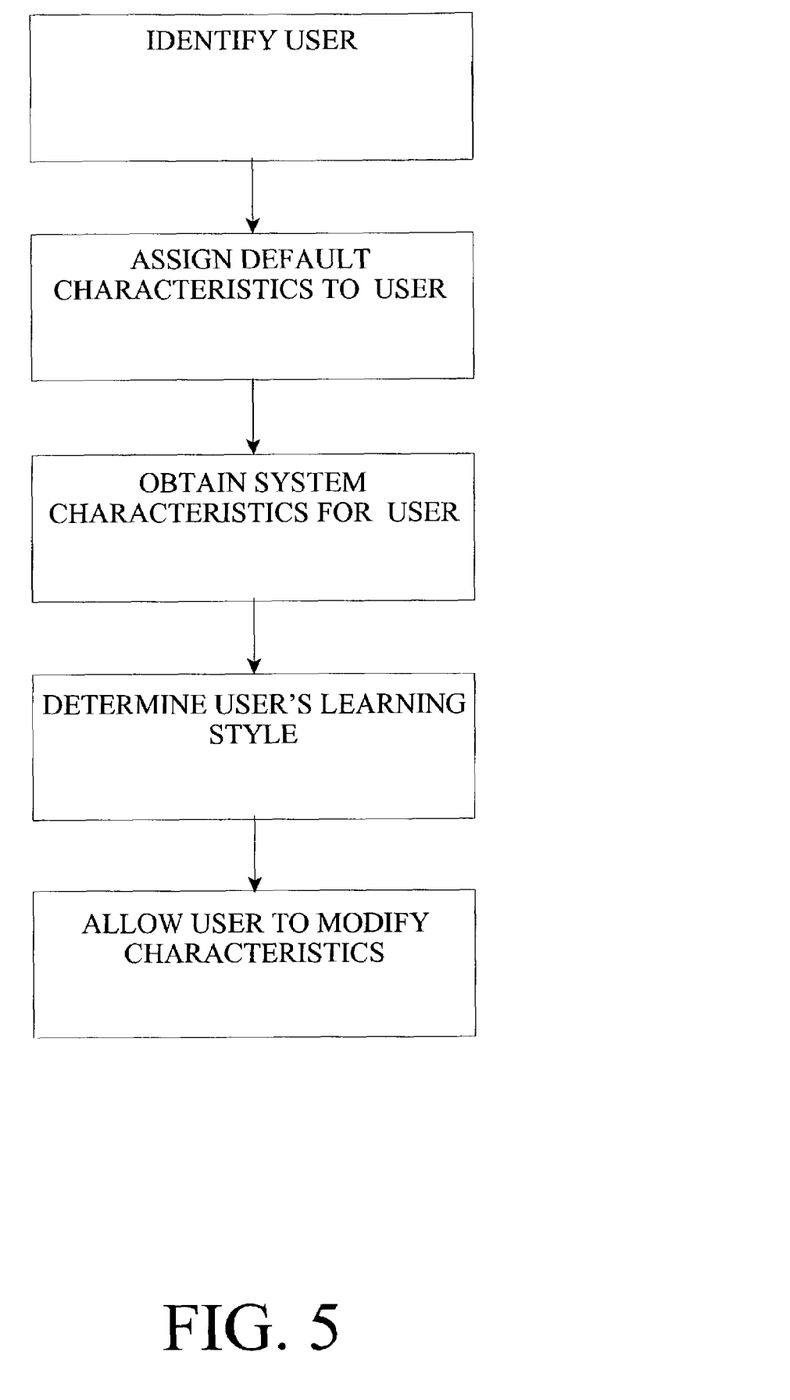
FIG. 5 depicts a method of defining user characteristics according to one aspect of the invention.

FIG. 5 depicts an exemplary method of defining user characteristics 46 for a user. In step S11, the particular user is identified. Based on this identification, a set of default user characteristics are assigned to the user in step S12. For example, groups of users may be set up on a network, each group having a corresponding default set of user characteristics. Further, once a particular user has used the custom learning system, the user characteristics can be stored and retrieved for later use. In step S113, the system characteristics for a user are obtained. A user may use the system from their office using a desktop computer linked by a high speed network, and then use the system when out in the field using a personal data assistant (PDA). The communication and display capabilities for each of these systems varies greatly, necessitating that the custom learning object be modified accordingly. In step S14, the user's learning style is determined. While a user style may have been previously assigned based on prior use, a user's learning style may vary according to the time of day, or the particular method of using the system.

For first time users, the user can be allowed to select a particular learning style, or a test can be provided to determine the learning style. Any type of test to identify a learning style can be implemented. As noted above, the results of such a test would map each user within an organization to a set of user characteristics (e.g., top down, visual learner, etc.). In an exemplary embodiment, there may exist 100 different possible outcomes or sets of user characteristics in which a user might be classified. Each individual could then be identified by such a result. In step S15, the user is allowed to modify the user characteristics. This allows users to continually tune the custom learning system according to their current needs and based on performance feedback while using the system.

For example, a user may be a technician searching for information on a particular product. In this case, user characteristics may default to showing a high level of detail because users in the technician user group generally desire a great deal of detail. However, if the user is searching only for a particular piece of data, a high level of detail can prove cumbersome to navigate. Consequently, the user can dynamically change a level of detail user characteristic to view less detail (i.e., zoom out) while navigating the information, and subsequently increase the level of detail (i.e., zoom in) as the location of the desired information is narrowed.

As noted, users can be allowed to dynamically change a level of detail of information to view, or zoom. This ability allows a user to dynamically adjust the quantity of information based on any number of factors, including network performance, ease of navigating the information, a type of information display, etc. Further, a user can adjust content based on his/her knowledge of the information and/or required knowledge. Once a user adjusts the desired level of detail, the current presentation of the information can be dynamically updated to reflect the new selection. For example, the table of contents may be the least level of detail for a particular book input into the system. Adjusting the zoom for additional detail may provide an outline of each chapter, zooming in further may provide summaries of the topics in the outline, etc.

Returning to FIG. 2, the set of knowledge atoms 44 and user characteristics 46 are provided to compiler system 38 that generates one or more custom learning objects 42 based on the above-described inputs. FIG. 3 depicts an exemplary implementation of compiler system 38. As shown, compiler system 38 includes an engine 50, handlers 52, and a container manager 54. Engine 50 performs the initial processing of knowledge atoms 44. For example, as discussed above, knowledge atoms 44 can be stored in a tree structure and engine 50 would walk the tree structure to process knowledge atoms 44. Engine 50 determines how to properly process each knowledge atom 44 based on one or more user characteristics 46. To perform additional processing of a knowledge atom 44, engine 50 calls one or more handlers 52, which dictate the output format of the knowledge atom. Engine 50 determines whether to call a particular handler 52, and if so which one, based on one or more user characteristics 46. For certain knowledge atoms 44, a handler 52 may call one or more handlers 52 to perform processing for a portion of knowledge atom 44.

For example, knowledge atom 44 can represent a "tip" that can be output in various different formats, depending on the user characteristics. Knowledge atom 44 will be assigned a handler 52 that performs the processing to appropriately output the "tip," e.g., as text, as an icon, as a popup, as highlighted text, as an audio file, etc. Engine 50 will select an "icon" handler 52 when a learning style user characteristic 46 is visual, an "audio file" handler 52 when a system attribute identifies a cell phone as the user device, etc. In some cases, a handler 52 may not be called at all for a particular knowledge atom 44 when a level of detail user characteristic 46 is set to filter out content at a particular level of detail (e.g., a marketing person may not need to see "tips").

Container manager 54 manages containers 58 on which each custom learning object 42 is based. A container 58 defines an output format. For example, containers 58 can define a web page, a word processor document, an audio file, a streaming video, etc. Container manager 54 adds and removes containers 58 from the one or more custom learning objects 42.

Each handler 52 includes the ability to incorporate the given knowledge atom 44 into one or more containers 58. Initially, handler 52 requests that container manager 54 provide an appropriate container 58 for the given knowledge atom 44. Container manager 54 determines the appropriate container 58 based on the one or more types of containers 58 associated with handler 52 and/or one or more user characteristics 46. Once handler 52 receives a container 58, it uses an appropriate presentation sheet 56 to incorporate the given knowledge atom 44 into container 58. Each presentation sheet 56 defines a mapping of a type of knowledge atom 44 to a handler 52. Alternatively, a presentation sheet 56 can define a mapping of a type of knowledge atom 44 to a type of container 58, or another object used in rendering a knowledge atom 44 into the appropriate format.

For example, knowledge atom 44 may identify the table of contents for a book. Engine 50 calls the handler 52 for processing a table of contents into text based on a learning style user characteristic 46. Handler 52 calls container manager 54 to receive a container 58. Container manager 54 provides handler 52 with a web page file based on a system attribute user characteristic 46 indicating that the user is operating a desktop computer. Handler 52 then uses a presentation sheet 56 that defines a mapping of a table of contents to a web page. Presentation sheet 56 may specify that table of contents data is listed down the left side of a web page, in a particular font type and size, using a particular color, hyperlinked to the corresponding data, etc. Based on a level of detail user characteristic 46, handler 52 may incorporate chapter headings, chapter and subchapter headings, etc. into container 58. The corresponding text for a particular chapter may be mapped into container 58 at a later time. When this is done, links between the table of contents entry and corresponding text can be included by container manager 54.

Once engine 50 has completed navigating the set of knowledge atoms 44 and all handlers 52 have completed processing knowledge atoms 44, container manager 54 provides the one or more custom learning objects 42 to the user. The user may select a portion of a learning object 42 to view. In this case, a new or altered set of knowledge atoms 44 are provided to engine 50 for processing, resulting in one or more new custom learning objects 42. Alternatively, the user may modify one or more user characteristics 46. In this case, engine 50 may only perform partial processing on knowledge atoms 44 to implement the resulting modifications to custom learning object(s) 42.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A custom electronic learning system, comprising:
   a characteristic system for defining a set of user characteristics for a user;
   a conversion system for converting a knowledge object into a set of knowledge atoms, wherein each knowledge atom includes:
      learning data based on a portion of information in the knowledge object;
      a type attribute describing the learning data; and
      a level attribute representing a measure of detail of the learning data; and
   a compiler system for generating a learning object based on the set of user characteristics and the set of knowledge atoms.

2. The system of claim 1, wherein the user characteristics include at least one of: a learning style, a level of detail, and system attributes.

3. The system of claim 1, wherein the set of knowledge atoms is stored as a tree structure.

4. The system of claim 3, wherein the compiler system includes an engine for walking the tree structure.

5. The system of claim 1, wherein the compiler system filters the set of knowledge atoms used to generate the learning object based on the level attribute of each knowledge atom.

6. A custom electronic learning system, comprising:
   a characteristic system for defining a set of user characteristics for a user;
   a conversion system for converting a knowledge object into a set of knowledge atoms; and
   a compiler system for generating a learning object based on the set of user characteristics and the set of knowledge atoms, wherein the compiler system includes:
      a set of containers, wherein each container defines an output format;
      a container manager for managing containers, wherein the learning object is based on at least one container; and
      a set of handlers, wherein each handler maps a knowledge atom into at least one of the set of containers.

7. The system of claim 6, wherein the compiler system further includes a set of presentation sheets for defining a mapping of a type of knowledge atom to a container, wherein each handler uses at least one presentation sheet to perform the mapping.

8. A method of generating a custom electronic learning object, comprising:
   receiving a knowledge object that includes information for presentation to a user;
   defining a set of user characteristics for the user;
   creating a set of knowledge atoms based on the knowledge object, wherein each knowledge atom includes:
      learning data based on a portion of the information in the knowledge object; and
      a type attribute describing the learning data; and
   generating the learning object based on the set of knowledge atoms and the set of user characteristics.

9. A method of generating a custom electronic learning object, comprising:
   receiving a knowledge object;
   defining a set of user characteristics for a user, wherein the defining step includes:
      assigning default values for at least one of the user characteristics; and
      selecting a value for at least one of the user characteristics;
   creating a set of knowledge atoms based on the knowledge object, wherein each knowledge atom includes:
      learning data based on a portion of information in the knowledge object; and
      a type attribute describing the learning data; and
   generating the learning object based on the set of knowledge atoms and the set of user characteristics.

10. The method of claim 9, wherein the defining step further includes testing the user to determine at least one of the user characteristics.

11. A method of generating a custom electronic learning object, comprising:
   receiving a knowledge object;
   defining a set of user characteristics for a user;

creating a set of knowledge atoms based on the knowledge object, wherein each knowledge atom includes:
: learning data based on a portion of information in the knowledge object; and
: a type attribute describing the learning data; and
: a level attribute representing a measure of detail of the learning data; and generating the learning object based on the set of knowledge atoms and the set of user characteristics, wherein the generating step filters the set of knowledge atoms based on the level attribute.

12. A method of generating a custom electronic learning object, comprising:
: receiving a knowledge object;
: defining a set of user characteristics for a user;
: creating a set of knowledge atoms based on the knowledge object, wherein each knowledge atom includes:
:: learning data based on a portion of information in the knowledge object; and
:: a type attribute describing the learning data; and
: generating the learning object based on the set of knowledge atoms and the set of user characteristics, wherein the generating step includes:
:: providing a set of containers, wherein each container defines an output format; and
:: providing a set of handlers, wherein each handler maps a knowledge atom having a particular type attribute into at least one of the set of containers.

13. The method of claim 12, wherein, for each knowledge atom, the generating step further includes:
: selecting one of the set of containers based on the type attribute;
: selecting one of the set of handlers based on the type attribute;
: mapping the knowledge atom into the selected container using the selected handler; and
: adding the mapped container into the learning object.

14. The method of claim 8, further comprising storing the set of knowledge atoms in a tree structure.

15. The method of claim 14, wherein the generating step includes walking the tree structure to handle each knowledge atom.

16. A system for generating a custom electronic learning object, comprising:
: a set of user characteristics for a user including a learning style;
: a set of knowledge atoms, wherein each knowledge atom includes learning data; and
: a compiler system for generating the learning object, the compiler system including a set of containers, wherein each container defines an output format; and
: wherein the learning object comprises each knowledge atom mapped into at least one container based on at least the learning style.

17. The system of claim 16, further comprising a characteristic system for defining the set of user characteristics.

18. The system of claim 16, further comprising a conversion system for converting a knowledge object into the set of knowledge atoms.

19. The system of claim 16, wherein the compiler system further includes:
: a set of handlers for mapping the set of knowledge atoms into the set of containers; and
: a set of presentation sheets, wherein each presentation sheet defines a mapping of a type of knowledge atom to a handler.

20. The system of claim 1, wherein the learning object comprises an electronic learning object for presentation to the user.

* * * * *